United States Patent Office 3,251,738
Patented May 17, 1966

3,251,738
ANTI-MICROBIAL POTENTIATION WITH AGENTS HAVING PLANT HORMONE ACTIVITY
George H. Scherr, 50 Monee Road, Park Forest, Ill.
No Drawing. Filed Mar. 8, 1963, Ser. No. 263,753
30 Claims. (Cl. 167—65)

This invention relates to antibiotics and their enhanced activity in synergistic or potentiating combinations.

This application in a continuation-in-part of my copending application, Serial No. 54,842, filed September 9, 1960, now abandoned, which was a continuation-in-part of my copending application, Serial No. 846,265, filed October 14, 1959, and now abandoned, and embodies certain subject matter from my application Serial No. 263,754, also filed March 8, 1963, and which is now abandonded.

The term "synergism" has not always been used to mean the same thing. In general, however, the term synergism has been used to refer to the activity of two agents both of which have some anti-microbial activity but which in combination display an activity greater than the sum of the two activities when each agent is used alone. Oftentimes an additive effect may be erroneously referred to as synergistic. Occasionally the term synergism has been used to refer to the combined action of two agents where one of the agents alone had little or no antimicrobial activity. The term "potentiation," in my opinion, more properly refers to the augmenting of the activity of an antibiotic agent by a substance which in itself has little or no anti-microbial activity. Discussions of the principles underlying synergism and/or potentiation have been discussed in such papers as those by Eagle and Saz, Annual Review of Microbiology, volume 9, pages 173–226, 1955; Lacy, 8th Symposium of the Society for General Microbiology, 1958, Cambridge University Press; Jawetz and Gunnison, Antibiotics and Chemotherapy, volume 2, pages 243–248, 1952; and Jawetz, Gunnison, and Coleman, Journal or Microbiology, volume 10, pages 191–198, 1954.

The disclosure of this invention will establish that an organism subjected to a concentration of antibiotic, even if the concentration is subinhibitory, can be altered in its physiology and biochemical activity in a manner that will make it more susceptible to certain agents that have little or no detectable inhibitory effect when used alone. Consequently, although I will use the term "synergism" throughout this application, it should be understood that the term synergism is being used synonymously with potentiation due to the fact that possibly both mechanisms may be acting either separately or together in the various combinations which are reported.

Thus, according to the present invention, an antimicrobial agent and a potentiating agent are contacted concurrently with the bacteria until greater antibacterial activity against said bacteria is demonstrable than the corresponding antibacterial activity demonstrable from either of said constituent members, viz., the antimicrobial agent and the potentiating agent, when used alone in equivalent amounts.

According to the present invention, it has been found that the antibiotic and anti-microbial agents, penicillin, chloramphenicol, bacitracin, polymyxin B, ristocetin, isonicotinic acid hydramide, streptomycin, and para-aminosalicylic acid form synergistic combinations with substances or agents that have plant hormone activity. By this is meant that the agents either are plant hormones or possess activity like plane hormones. The agents possess little or no measurable antibiotic activity in themselves. Such agents, however, do not form synergistic combinations with every antibiotic under discussion. This, as well as the synergistic activity found, will be clear from the experimental findings infra.

EXPERIMENT A

The basic procedure utilized was the strip-gradient plate technique (see Bact. Proc. 1956, p. 30, and Antibiotics Annual, 1956–1957, New York, Medical Encyclopedia, Inc., 1957, pp. 906–917). Gradient plates were prepared with medium No. 3 of Grove and Randall, Assay Methods of Antibiotics: a Laboratory Manual, New York, Medical Encyclopedia, Inc., 1955, to which agar was added. For the more diffusible anti-bacterial substances, routine laboratory agar-agar was used at 1.5 percent concentration. For the large molecule antibiotics, 0.75 percent Ionagar No. 2 agar was used, since it permits better diffusion than conventional agars (Antib. & Chemo. 8: 599, 1958). Each layer of the gradient contained 12.5 ml. of medium, with the antibiotic incorporated in the upper layer. These plates were overlaid with 3.5 ml. of seeded agar.

The test organisms used in these studies were *Staphylococcus aureus* 209 (ATCC 6538P) and *Sarcina lutea* (ATCC 5341). Plates were incubated for 18 hours at 35° C. before being read.

The antibiotic solutions were prepared in accordance with the instructions of Grove and Randall, supra. The antibiotics were dissolved in the upper layers of the gradient plates at the following concentrations: *S. lutea* penicillin, 0.03 unit; chloramphenicol, 0.30 $\mu$g.; Staphylococcus penicillin, 0.4 unit; chloramphenicol, 2.0 $\mu$g.; erythromycin, 0.25 $\mu$g.; bacitracin, 60 $\mu$g.; polymyxin B, 150 $\mu$g.; ristocetin, 5 $\mu$g.; oxytetracycline, 0.20 $\mu$g.; chlortetracycline, 0.10 $\mu$.; tetracycline, 0.1 $\mu$g.

All agents were run against the test organisms on gradient plates without antibiotics added.

Synergism or antagonism is recorded as a fraction in which the numerator is the distance in mm., representing the limiting concentrations of the agent in the strip, which is active for any particular concentration of the antibiotic, and in which the denominator is the distance in mm., representing the limiting concentrations of the antibiotic, which is active for any particular concentration of the agent in the strip. Where both synergism and antagonism occurred on the same plate, these are so recorded with no attempt at measurement. Plates on which the zone of inhibition was less than 5 mm. are recorded as showing a trace of activity. All tests were run in duplicate. Sodium acetate and propionate were included to exclude the possibility that acetate or propionate ions were responsible for reaction with agents having these radicals.

Table I following summarizes the data for interaction between the agents tested and penicillin and chloramphenicol, with *S. lutea* as the test organism. For the tests the agents were diluted or dissolved in water for application to the test plates, unless otherwise indicated. When other diluents, e.g., ethanol, were used, they were tested independently as potentiating agents and were found to have essentially no activity as such.

Table I

STRIP-GRADIENT PLATE RESULTS WITH S. LUTEA [1]

| Agent on strip 1000 μg./strip | Antibacterial agent in gradient | | |
|---|---|---|---|
| | None | Penicillin | Chloramphenicol |
| Kinetin [2] | Neg | Tr. S | Neg. |
| Furfuryl kinetin [2] | Neg | Tr. S | Neg. |
| Indole-3-acetic acid | Neg | S. 5/5 | Neg. |
| 2,4,6-trichlorophenoxyacetic acid | Neg | S. 10/10 | Neg. |
| Naphthalene acetic acid | Neg | S. 15/10 | Neg. |
| α,α'-Dichloropropionic acid | Neg | Tr. S | Neg. |
| α-Phenoxypropionic acid | Neg | A. 30/10 | Neg. |
| Indole-3-propionic acid | Neg | Tr. A | Tr. S. |
| α(2,4-dichlorophenoxy) propionic acid | Neg | Tr. S | Neg. |
| Sodium acetate | Neg | Tr. A | Neg. |
| Sodium propionate | Neg | Neg | Neg. |

[1] Neg.=no activity; Tr.=trace of activity; Inh.=inhibition of growth; Stim.=stimulation of growth; S.=synergism; A.=antagonism.
[2] Five hundred μg./strip.

Table II below presents the data for interaction between the agents tested and penicillin, chloramphenicol, oxytetracycline, tetracycline, and chlortetracycline, with Staphylococcus as the test organism.

penicillin against *S. lutea*, with penicillin, chloramphenicol, erythromycin, bacitracin, polymyxin B, and ristocetin against *Staph. aureus*. It will be shown infra that it also showed frank synergism with isoniazid and streptomycin against *Mycobacterium tuberculosis*. Indole-3-propionic acid, alpha - (2,4 - dichlorophenoxy)propionic acid and alpha-(2,4,5-trichlorophenoxy)propionic acid are also shown to be very active synergists.

EXPERIMENT B

The strip-gradient plate method, the basic procedures utilized, and the agents tested were essentially those of Experiment A supra. The antimycobacterial agents were prepared in solutions of phosphate buffer No. 1 of Grove and Randall and dilutions made with the same solution. The test organism was *Mycobacterium tuberculosis* 607, an attenuated, fast-growing strain reputed to be the Koch strain. Stock suspensions of the test organism were prepared by growing it in Medium No. 3 of Grove and Randall for 72 hours at 35° C. with frequent shaking to assure a farily homogeneous suspension. This suspension was kept in the refrigerator for up to 30 days, and a 0.1 ml. volume was used to inoculate 3.5 ml. of seed agar used in preparing the gradient plates. The agents

Table II

STRIP-GRADIENT PLATE RESULTS WITH STAPH. AURES 209 [1]

| Agent on strip, 1,000 μg./strip | None | Oxytetracycline | Tetracycline | Chlortetracycline | Penicillin | Chlorampehnicol |
|---|---|---|---|---|---|---|
| Kinetin [2] | Tr. Inh | S. 15/10 | S. 10/10 | S. 10/10 | S. 10/15 | Tr. S. |
| Furfuryl kinetin [2] | Tr. Inh | S. 10/10 | S. 15/10 | S. 10/10 | S. 5/15 | Neg. |
| Indole-3-acetic acid | Neg | Neg | A. 10/5 | S. 20/10 | Neg | Neg. |
| 2,4,6-trichlorophenoxyacetic acid | Neg | Neg | Tr. A. and S | Tr. A. and S | S. 10/25 | S. 12/5. |
| Naphthalene acetic acid | Neg | Neg | A. 15/15 | S. 10/15 | A. 10/5 | Neg. |
| α,α-Dichloropropionic acid | Neg | Neg | S. 5/10 | S. 30/30 | Neg | Neg. |
| α-Phenoxypropionic acid | Neg | Neg | Tr. A. and S | S. 10/10 | Neg | Neg. |
| Indole-3-propionic acid | Tr. Inh | S. 15/15 | Tr. S | Tr. S | Neg | Tr. S. |
| α(2,4-dichlorophenoxy) propionic acid | Neg | Tr. A. and S | Neg | Tr. S | Neg | Tr. S. |
| α(2,4,5-trichlorophenoxy) propionic acid | Tr. Inh | Tr. S | Tr. S | Tr. S | S. 12/20 | Tr. S. |
| Sodium acetate | Neg | Neg | Neg | Neg | Neg | Neg. |
| Sodium propionate | Neg | Neg | Neg | Neg | Neg | Neg. |

[1] Neg. = no activity; Tr. = trace of activity; Inh. = inhibition of growth; Stim. = stimulation of growth; S. = synergism; A. = antagonism.
[2] Five hundred μg./strip.

Table III summarizes the data for the interaction between the agents tested and the four antibiotics: erythromycin, bactracin, polymyxin B, and ristocetin, using Staphylococcus as the test organism.

were tested against the test organism alone. Because pyridine-3-sulfonic acid is inhibitory to the 607 strain, and also because pyradine-3-sulfonic acid and isonicotinic-acid-hydrazide (isoniazid) are both antagonist of niacin,

Table III

STRIP-GRADIENT PLATE RESULTS WITH STAPH. AUREUS 209 [1]

| Agent on strip, 1,000 μg./strip | Antibacterial agent in gradient | | | | |
|---|---|---|---|---|---|
| | None | Erythromycin | Bacitracin | Polymyxin B | Ristocetin |
| Kinetin [2] | Tr. Inh | Neg | Neg | Tr. A | A. 10/10. |
| Furfuryl kinetin [2] | Tr. Inh | Neg | S. 5/15 | Neg | Tr. A. |
| Indole-3-acetic acid | Neg | S. 10/5 | Tr. A | Neg | A. 7/5. |
| 2,4,6-trichlorophenoxyacetic acid | Neg | S. 25/30 | S. 22/10 | S. 20/35 | S. 25/15. |
| Naphthalene acetic acid | Neg | S. 7/10 | Neg | Tr. S | Tr. A. |
| α-Phenoxypropionic acid | Neg | S. 20/10 | Neg | Neg | Tr. A. and S. |
| Indole-3-propionic acid | Tr. Inh | Tr. S | S. 5/10 | Tr. A | Tr. A. |
| α(2,4-dichlorophenoxy) propionic acid | Neg | S. 10/15 | Tr. S | S. 5/35 | Tr. S. |
| Alpha (2,4,5-trichlorophenoxy) propionic acid | Tr. Inh | S. 10/10 | S. 10/20 | S. 10/60 | S. 25/15. |
| Sodium acetate | Neg | Neg | Neg | Neg | Neg. |
| Sodium propionate | Neg | Neg | Neg | Neg | Tr. A. |

[1] For code, see Table I.   [2] Five hundred μg. of agent used per strip.

It is most significant that a few of the compounds showed consistent synergistic activity with a variety of antibiotics and organisms studied. For example, 2,4,6-trichlorophenoxyacetic acid showed frank synergism with it was decided to add pyridine-3-sulfonic add to the series of anti-mycobacterial agents tested; the comparative inhibitory effect of the compound is depicted in Table IV.

Table IV
COMPARATIVE ACTIVITY OF PYRIDINE-3-SULFONIC ACID ISONIAZID AND STREPTOMYCIN BY WEIGHT USING Mycobacterium Tuberculosis 607 STRAIN
[12.7 mm. discs used]

| Concentration in disc (μgm.) | Diameter of zones inhibition mm. | | |
|---|---|---|---|
| | Isoniazid | Streptomycin | Pyridine-3-sulfonic acid |
| 1,000 | 70 | 55 | 50 |
| 100 | 55 | 47 | 31 |
| 10 | 33 | 37 | 14 |
| 1 | 15 | 16 | 13 |

Unless otherwise indicated, the agents tested for synergistic activity were pipetted on the strip in water, in a volume of 0.1 ml. containing 1 mg. The anti-mycobacterial agents were added to the upper layers of gradient plates at the following concentrations:

Agent:            Conc./ml. in upper layer or gradient plates (μgm)
Isoniazid ---------------------------------- 4.0
Para-aminosalicylic acid ------------------ 250.0
Streptomycin ------------------------------ 2.0
Pyridine-3-sulfonic acid ------------------ 20.0

All plates were incubated 72 hours at 35° C. and read as in Experiment A.

Table V summarizes the data for interaction between the agents tested and *M. tuberculosis* 607 with four anti-mycobacterial substances.

Synergism or antagonsim, when present, was designated here as frank synergism or antagonism; otherwise such activity was designated as "trace."

Table V
STRIP-GRADIENT PLATE RESULTS WITH Mycobacterium Tuberculosis 607 [1]

| Agent on strip, 1,000 μg./strip | Anti-mycobacterial agent in gradient | | | | |
|---|---|---|---|---|---|
| | None | Isoniazid | p-Amino salioylic acid | Pyridine-3 sulfonic acid | Streptomycin |
| Kinetin [2] | Neg | Tr. A | Neg | Neg | Tr. A. |
| Furfuryl kinetin [2] | Neg | Tr. A | Neg | Neg | Tr. S. |
| Indole-3-acetic acid | Neg | Neg | Neg | Neg | Tr. A. |
| 2,4,5-trichlorophenoxyacetic acid | Neg | S. 5/30 | Tr. S | Neg | S. 10/5 |
| Naphthalene acetic acid | Neg | Tr. S. and A | Neg | Tr. A | Neg. |
| α,α'-Dichloropropionic acid | Neg | Tr. A | Neg | Tr. S | Tr. A. |
| α-Phenoxypropionic acid | Neg | Tr. S | Neg | Neg | Tr. S. |
| Indole-3-propionic acid | Neg | Tr. A | Tr. S | S-10/30 | Tr. S. |
| α (2,4-dichlorophenoxy) propionic acid | Neg | S. 10/20 | Tr. S | Tr. A | Tr. S. |
| α-(2,4,5-trichlorophenoxy) propionic acid | Neg | S. 10/30 | Tr. S | Tr. A | S. 30/15. |
| Sodium acetate | Neg | Neg | Neg | Neg | Neg. |
| Sodium propionate | Neg | Neg | Neg | Neg | Neg. |

[1] See Table I for legends. [2] Only 500 μg. on these strips.

The agents that showed frank synergism with strepomycin were:

(1) α-(2,4,5-trichlorophenoxy) propionic acid
(2) 2,4,6-trichlorophenoxyacetic acid Three of these compounds also showed good synergism with isoniazid: 2,4,6-trichlorophenoxyacetic acid, α-(2,4,5-trichlorophenoxy) propionic acid, and α-(2,4-dichlorophenoxy) propionic acid.

The overall activity of two of the more active agents can be summarized as follows:
(1) 2,4,6-trichlorophenoxyacetic acid showed frank synergism with penicillin for *S. lutea*; with penicillin, chloramphenicol, erythromycin, bacitracin, polymyxin B, and ristocetin for *S. aureus*; and with isoniazid and streptomycin for *M. tuberculosis* 607.
(2) Alpha - (2,4,5 - trichlorophenoxy)propionic acid showed frank synergism with penicillin, erythromycin, bacitracin, polymyxin B, and ristocetin for *S. aureus*, and with isoniazid, and streptomycin for *M. tuberculosis* 607.

2,4,6-trichlorophenoxyacetic acid and alpha-(2,4,5-trichlorophenoxy) propionic acid are plant growth hormones and might well be acting as such on the microorganisms when certain intracellular mechanisms become susceptible to such action concomitant with exposure to antiobiotics.

EXPERIMENT C

Toxicity studies with a number of the agents tested in Experiments A and B were performed. Single doses intraparitoneal inoculations made in 25 gm. albino mice indicated that the toxicity in mg./kgm. of body weight was 250 for α-(2,4,5-trichlorophenoxy) propionic acid and greater than 500 for 2,4,6-trichlorophenoxyacetic acid.

α-(2,4,5-trichlorophenoxy) propionic acid (α-TPP) was tested in mice as follows:

Material and methods

The strain of beta-hemolytic Streptococcus used in the following experiments was built up in pathogenicity, and would kill Swiss mice. The organism was always harvested from frozen dead mice which had previously been infected by the intravenous route. Such thawed mice were autopsied and fragments from the liver, spleen or kidney, or a loopful of hearts blood, were streaked on tryptose blood agar plates and incubated for 24 hours at 37° C. Beta hemolytic colonies were picked and transferred to 5 ml. of Todd-Hewitt broth in a test tube. Such a culture, after incubation for 18 hours, could be quickly frozen and stored for use at a later date if more convenient. The Todd-Hewitt cultures were used as an inoculum in 0.1 ml. volumes for tryptose blood agar slants contained in large screw cap tubes and incubated for 18 hours at 37° C. Three ml. of sterile saline was added to each of these slants, the organisms were gently washed off the slants with a sterile loop, and pooled suspensions were centrifuged at 2000–5000 r.p.m. for 15 minutes. The supernatant was decanted, the cells were washed a second time, and then they were transferred with saline to a Kolmer centrifuge tube to which saline was added to a final volume of 10 ml. The packed cell volume was then determined so that the final suspension of organisms would result in 10 mg. of net weight of organisms per ml. of suspension; this produced 1 mg. of wet weight per 0.1 ml. of suspension, which constituted the I.V. infecting dose for mice.

Approximately 20 gm. Swiss mice, which had been separated according to sex, were infected with the above suspension of cells.

In the testing of α-TPP, the animals to be treated by the intraperitoneal route were injected with either penicillin or the mixture of penicillin and the potentiating agent. Treatment was instituted within 24 hours after infection. If two treatment doses were administered, they were separated by a 48 hour period. Mice treated by the intramuscular route received .05 ml. of the antibiotic or the antibiotic and the synergist mixture.

Three different experiments were performed as follows: 2 doses of penicillin of 50 units each injected I.P.; a single dose of 25 units of penicillin given by the intramuscular route; 2 doses of penicillin of 10 units each given by the intramuscular route. The doses of penicillin used here were deliberately chosen to be very close to the minimum necessary to elicit a small increase in survivors.

The above treatment schedules were also duplicated using the same concentrations of penicillin to which had been added 1 mg. of α-TPP. The effectiveness of the treatment schedules was assessed by counting the survivors 5 days after infection. The results of these experiments are outlined in Table VI.

an effect on the growth of micro-organisms, it was determined if this potentiating agent also affected the rate of cell multiplication of the Streptococcus. If it were increasing the rate of multiplication, its potentiating activity might be explained by a possible increased lability of the faster multiplying Streptococcus to penicillin. However, direct cell counts, using a hemocytometer, on cultures grown in Todd-Hewitt broth, with and without 100 mcg. per ml. of the agent, showed essentially identical growth curves for 51 hours of observation.

It is demonstrated that compounds having little or no anti-microbial activity when used along acted as synergists when used in combination with antibiotics. The synergistic combination comprising an antibiotic and one of the synergistic agents are readily prepared by combining the materials by simple mixing or with carriers, stabilizing agents and the like. Tablets, capsules, solutions and suspensions of such compositions can be readily prepared by those skilled in the art.

Animal experiments were also performed using the

*Table VI*

POTENTIATING EFFECT OF α(2,4,5-TRICHLOROPHENOXY) PROPIONIC ACID FOR PENICILLIN ON STREPTOCOCCUS-INFECTED MICE
[Number mice surviving 5 days after infection/total infected]

PART 1A

| Sex | Infected untreated | Percent surviving | Infected, treated I.P. with 2 doses of 50 I.U. penicillin each 48 hours apart | Percent surviving | Infected, treated as in previous group but with 1 mg. potentiating agent added | Percent surviving |
|---|---|---|---|---|---|---|
| M | 1/15 | | 4/10 | | 7/10 | |
| F | 1/15 | | 3/8 | | 7/10 | |
| Total | 2/20 | (10) | 7/18 | (39) | 14/20 | (70) |

PART 1B

| Sex | Infected untreated | Percent surviving | Infected, treated I.M. with one dose of 25 I.U. penicillin | Percent surviving | Infected, treated as in previous group but with 1 mg. potentiating agent added | Percent surviving |
|---|---|---|---|---|---|---|
| M | 3/11 | | 2/14 | | 5/14 | |
| F | 1/16 | | 6/15 | | 12/15 | |
| Total | 4/27 | (14.8) | 8/29 | (27.6) | 17/29 | (58.6) |

PART 1C

| Sex | Infected untreated | Percent surviving | Infected, treated I.M. with 2 doses of 10 I.U. each, 48 hours apart | Percent surviving | Infected, treated as in previous group but with 1 mg. potentiating agent added | Percent surviving |
|---|---|---|---|---|---|---|
| M | 3/11 | | 5/15 | | 6/15 | |
| F | 1/16 | | 4/15 | | 10/15 | |
| Total | 4/27 | (14.8) | 9/30 | (30) | 16/30 | (53.3) |

It will be noted that, in general, the dosage of penicillin increased by approximately two-fold the percent survivors as compared to the infected untreated animals. In every single case, the addition of 1 mg. of α-TPP served still further to significantly increase the percent survivors; this can be seen in parts 1a, 1b, and 1c.

The increase in the percent survival, which can be attributed to the potentiating action of the agent, was in every case approximately double that found when penicillin was used alone. From similar experiments it was determined that the potentiating agent used alone, either at this dose level of 1 mg. or at lesser or greater dose levels, had no effect in altering the course of survival of infected animals. Furthermore, the potentiating agent when used alone on normal uninfected mice did not appear toxic at the dose schedule utilized here.

Since the potentiating agent is a plant hormone and a number of plant hormones have been shown to have infectious agent *Klebsiella pneumoniae*. Swiss mice, of 20 gram weight, which had been separated according to sex, were infected I.P. with approximately 48,000 cells of a culture of *Klebsiella pneumoniae*. Treatment with 10 mcg. streptomycin and/or 250 mcg. of α-TPP or 250 mcg. 2,4,6-trichlorophenol (TCP) was effected by a single dose intramuscular injection with the agents dissolved in 0.05 ml. of phosphate buffer.

All treatment was instituted within 24 hours after infection but not earlier than 4 hours post infection. Table VII outlines the results with α-TPP and TCP. It will be noted in Table VII that there are differences between the sexes especially evident in the surviving mice which had been treated with the streptomycin plus the 2,4,6-trichlorophenol. It is clear that treatment solely with the alpha-(2,4,5-trichlorophenoxy)propionic acid or the 2,4,6-trichlorophenol did in no way favorably alter the course of mortality of these Klebsiella infected mice.

Table VII

POTENTIATING EFFECT OF α-(2,4,5-TRICHLOROPHENOXY) PROPIONIC ACID (α-TPP) AND 2,4,6-TRICHLOROPHENOL (TCP) FOR STREPTOMYCIN IN THE TREATMENT OF MICE INFECTED WITH K. PNEUMONIAE

| Days post infection | Number surviving mice | | | | | | | | | | | |
|---|---|---|---|---|---|---|---|---|---|---|---|---|
| | Infected, untreated | | Infected, treated with streptomycin | | Infected, treated with streptomycin and α-TPP | | Infected, treated with streptomycin and α-TCP | | Infected, treated with α-TPP | | Infected, treated with TCP | |
| | M | F | M | F | M | F | M | F | M | F | M | F |
| 1 | 15 | 15 | 15 | 15 | 15 | 15 | 15 | 15 | 15 | 15 | 15 | 15 |
| 2 | 15 | 15 | 15 | 15 | 15 | 15 | 15 | 15 | 15 | 15 | 15 | 14 |
| 3 | 7 | 6 | 10 | 8 | 13 | 13 | 8 | 13 | 6 | 6 | 7 | 6 |
| 4 | 5 | 4 | 9 | 7 | 12 | 12 | 8 | 13 | 4 | 5 | 4 | 5 |
| 5 | 5 | 3 | 9 | 7 | 12 | 11 | 7 | 13 | 3 | 5 | 4 | 5 |
| 6 | 5 | 3 | 9 | 7 | 12 | 11 | 7 | 12 | 3 | 5 | 4 | 5 |
| 7 | 5 | 3 | 9 | 7 | 12 | 11 | 6 | 12 | 3 | 5 | 4 | 4 |
| 8 | 4 | 3 | 9 | 7 | 12 | 11 | 5 | 13 | 3 | 5 | 4 | 4 |
| 9 | 4 | 3 | 9 | 7 | 12 | 11 | 5 | 13 | 3 | 5 | 4 | 4 |
| 10 | 4 | 3 | 9 | 7 | 12 | 11 | 5 | 13 | 3 | 5 | 4 | 4 |
| 11 | 4 | 3 | 9 | 7 | 12 | 10 | 5 | 13 | 3 | 5 | 4 | 3 |
| 12 | 4 | 3 | 9 | 7 | 12 | 10 | 5 | 13 | 3 | 5 | 4 | 3 |
| 13 | 4 | 3 | 9 | 7 | 12 | 10 | 5 | 13 | 3 | 5 | 4 | 3 |
| 14 | 4 | 3 | 9 | 6 | 12 | 10 | 5 | 13 | 3 | 5 | 4 | 3 |
| 15 | 4 | 3 | 9 | 6 | 12 | 10 | 5 | 13 | 3 | 5 | 4 | 3 |
| Percent survival at 5 days | 33.3 | 20 | 60 | 46 | 80 | 73 | 46 | 87 | 20 | 33.3 | 26 | 33.3 |
| Overall percent survival at 5 days | 26.7 | | 53.3 | | 76.7 | | 66.7 | | 26.7 | | 30.0 | |

EXPERIMENT D

Strip-gradient plates were used to test the potentiating activity of a number of agents against *S. lutea*, *Staphylococcus aureus* No. 209, and *M. tuberculosis* No. 607, using the antimicrobial agents penicillin, chloramphenicol, erythromycin, tetracycline, chlortetracycline, oxytetracycline, ristocetin, polymyxin B, bacitracin, isoniazid, p-aminosalicylic acid, pyridine-3-sulfonic acid, and streptomycin.

Tables VIII, IX, and X present the data for the organism *S. lutea*, *S. aureus*, and *M. tuberculosis* No. 607, respectively.

Table VIII

STRIP GRADIENT PLATE RESULTS WITH SARCINA LUTEA [1]

| Agent on strip, 1,000 μg./strip | Antibacterial agent in gradient | | |
|---|---|---|---|
| | None | Penicillin | Chloramphenicol |
| p-Chlorophenoxyacetic acid | Neg. | Tr. S | Neg. |
| 2,4-Dichlorophenoxy acetic acid | Neg. | Tr. S | Neg. |
| 2,5-Dichlorophenoxy acetic acid | Neg. | Tr. A | Neg. |
| 3,4-Dichlorophenoxy acetic acid | Neg. | S. 20/10 | Neg. |
| 2,4,5-Trichlorophenoxy acetic acid | Neg. | Tr. S | Neg. |
| 2,4,6-Trichlorophenoxyacetic acid | Neg. | S. 10/10 | Neg. |
| 2,3,4,6-Tetrachlorophenoxy acetic acid | Neg. | S. 20/10 | Tr. S. |
| Pentachlorophenoxyacetic acid | 5 mm. Inh. | S. 20/15 | S. 5/65. |
| α α' Dichloropropionic acid | Neg. | Tr. S | Neg. |
| α-Phenoxypropionic acid | Neg. | A. 30/10 | Neg. |
| 2(P-chlorophenoxy) propionic acid | Neg. | Neg. | Neg. |
| 3(P-chlorophenoxy) propionic acid | Neg. | S. 20/5 | Neg. |
| Alpha-(2,4-dichlorophenoxy) propionic acid | Neg. | Tr. S | Neg. |
| 2,4,5-trichlorophenoxypropionic acid (Alpha) | Neg. | Tr. S | Neg. |
| 3(2,4,5-Trichlorophenoxy) propionic acid | Neg. | S. 30/15 | Neg. |
| Indole-3-propionic acid | Neg. | Tr. A | Tr. S. |
| Alpha-naphthaleneacetic acid | Neg. | S. 15/10 | Neg. |
| Indole-3-acetic acid | Neg. | S. 5/5 | Neg. |
| 2,4,6-trichlorophenol | Tr. Inh. | Tr. A. and S. | S. 5/65. |

[1] See Table I for code designations.

Table IX
STRIP-GRADIENT PLATE RESULTS WITH *STAPH. AUREUS* 209 [1]

| Agent on strip 1000 μg./strip | Antibacterial agent in gradient | | | | |
|---|---|---|---|---|---|
| | None | Penicillin | Chloramphenicol | Erythromycin | Tetracycline |
| p-Chlorophenoxyacetic acid | Neg | Neg | Neg | S. 10/20 | Neg. |
| 2,4-dichlorophenoxyacetic acid | Neg | Tr. S | Neg | Tr. S | Neg. |
| 2,5-dichlorophenoxyacetic acid | Neg | Neg | Neg | S. 10/10 | A. 25/10. |
| 3,4-dichlorophenoxyacetic acid | Tr. Stim | Tr. A | S. 5/25 | Tr. S | Tr. S. |
| 2,4,5-trichlorophenoxyacetic acid | Tr. Stim | Tr. A | S. 15/20 | S. 10/5 | Tr. S. |
| 2,4,6-trichlorophenoxyacetic acid | Neg | S. 10/25 | S. 12/5 | S. 25/30 | Tr. A. and S. |
| 2,3,4,6-tetrachlorophenoxyacetic acid | 3 mm. Inh | S. 5/35 | A. 5/30 | S. 20/10 | Tr. A. |
| Pentachlorophenoxyacetic acid | 5 mm. Inh | Neg | S. 5/30 | S. 10/10 | S. 5/40. |
| α-Phenoxypropionic acid | Neg | Neg | Neg | S. 20/10 | Tr. A. and S. |
| 2(p-chlorophenoxy) propionic acid | Neg | Neg | Neg | S. 20/25 | S. 20/5. |
| 3(p-chlorophenoxy) propionic acid | Neg | Neg | Neg | S. 15/10 | A. 10/5. |
| α(2,4-dichlorophenoxy) propionic acid | Neg | Neg | Tr. S | S. 10/15 | Neg. |
| 2,4,5-trichlorophenoxypropionic acid (alpha) | Tr. Inh | S. 12/20 | Tr. S | S. 10/10 | Tr. S. |
| 3(2,4,5-trichlorophenoxy) propionic acid | 10 mm. Inh | A. 5/50 | A. 5/4 | S. 20/30 | S. 10/15. |
| Indole-3-propionic acid | Tr. Inh | Neg | Tr. S | Tr. S | Tr. S. |
| alpha-Naphthalene acetic acid | Neg | A. 10/5 | Neg | S. 7/10 | A. 15/15. |
| Indole-3-acetic acid | Neg | Neg | Neg | S. 10/5 | A. 10/5. |
| 2,4,6-trichlorophenol | 10 mm. Inh | Neg | Tr. S | S. 15/45 | S. 25/30. |
| p-Chlorophenoxyacetic acid | S. 10/15 | Neg | Neg | Neg | Tr. S. |
| 2,4-dichlorophenoxyacetic acid | Neg | Tr. A | Neg | Neg | Neg. |
| 2,5-dichlorophenoxyacetic acid | Tr. A | Tr. A | Neg | Neg | Neg. |
| 3,4-dichlorophenoxyacetic acid | S. 15/50 | Tr. A | S. 15/15 | S. 5/35 | S. 10/10. |
| 2,4,5-trichlorophenoxyacetic acid | S. 15/35 | Tr. A | A. 20/5 | S. 5/60 | A. 10/10. |
| 2,4,6-trichlorophenoxyacetic acid | Tr. A. and S | Neg | S. 25/15 | S. 20/35 | S. 22/10. |
| 2,3,4,6-tetrachlorophenoxyacetic acid | A. 5/40 | Tr. A | S. 5/40 | A. 5/30 | A. 15/20. |
| Pentachlorophenoxy-acetic acid | A. 5/30 | S. 10/40 | Neg | Neg | A. 10/10. |
| α-Phenoxypropionic acid | S. 10/10 | Neg | Tr. A. and S | Neg | Neg. |
| 2(P-chlorophenoxy) propionic acid | Neg | Neg | Neg | Tr. S | Neg. |
| 3(P-chlorophenoxy) propionic acid | S. 10/5 | Neg | S. 25/10 | Tr. S | Tr. S. |
| α(2,4-dichlorophenoxy) propionic acid | Tr. S | Tr. A. and S | Tr. S | S. 5/35 | Tr. S. |
| 2,4,5-trichlorophenoxypropionic acid (alpha) | Tr. S | Tr. S | S. 25/15 | S. 10/60 | S. 10/20. |
| 3(2,4,5-trichlorophenoxy) propionic acid | S. 10/20 | S. 10/15 | Neg | Neg | S. 10/20. |
| Indole-3-propionic acid | Tr. S | S. 15/15 | Tr. A | Tr. A | S. 5/10. |
| alpha-Naphthalene acetic acid | S. 10/15 | Neg | Tr. A | Tr. S | Neg. |
| Indole-3-acetic acid | S. 20/10 | Neg | A. 7/5 | Neg | Tr. A. |
| 2,4,6-trichlorophenol | S. 25/30 | S. 30/35 | S. 20/35 | Tr. S | S. 10/40. |

[1] See Table I for legends.

Table X
STRIP-GRADIENT PLATE RESULTS WITH *M. TUBERCULOSIS* NO. 607 [1]

| Agent on Strip 1,000 μg./strip | Antibacterial agent in gradient | | | | |
|---|---|---|---|---|---|
| | None | Isoniazid | p-Amino-salicylic acid | Pyridine-3-sulfonic acid | Streptomycin |
| p-Chlorophenoxyacetic acid | Neg | Neg | Neg | Neg | Neg. |
| 2,4-dichlorophenoxyacetic acid | Tr. Inh | Neg | Neg | Tr. A | Tr. A. |
| 2,5-dichlorophenoxyacetic acid | Tr. Inh | Tr. A | Neg | A. 10/10 | S. 10/5. |
| 3,4-dichlorophenoxyacetic acid | Neg | Tr. A | Neg | A. 15/10 | Tr. S. |
| 2,4,5-trichlorophenoxyacetic acid | Tr. Inh | S. 10/10 | Neg | A. 10/5 | Tr. S. |
| 2,4,6-trichlorophenoxyacetic acid | Neg | S. 5/30 | Tr. S | Neg | S. 10/5. |
| 2,3,4,6-tetrachlorophenoxyacetic acid | Tr. Inh | Tr. S | Tr. S | Neg | Tr. S. |
| Pentachlorophenoxyacetic acid | 10 mm. Inh | A. 5/25 | A. 5/40 | A. 5/20 | S. 10/10. |
| α,α'-Dichloropropionic acid | Neg | Tr. A | Neg | Tr. S | Tr. A. |
| α-Phenoxypropionic acid | Neg | Tr. S | Neg | Neg | Tr. S. |
| 2(p-chlorophenoxy) propionic acid | Neg | S. 25/15 | Neg | Neg | Tr. S. |
| 3(p-chlorophenoxy) propionic acid | Neg | Tr. S | Neg | A. 25/10 | Tr. A. |
| α-(2,4-dichlorophenoxy) propionic acid | Neg | S. 10/20 | Tr. S | Tr. A | Tr. S. |
| 2,4,5-trichlorophenoxypropionic acid (alpha) | Neg | S. 10/30 | Tr. S | Tr. A | S. 30/15. |
| 3(2,4,5-trichlorophenoxy) propionic acid | 10 mm. Inh | A. 5/5 | Neg | S. 5/15 | Tr. S. |
| Indole-3-propionic acid | Neg | Tr. A | Tr. S | S. 10/30 | Tr. S. |
| alpha-Naphthalene acetic acid | Neg | Tr. A. and S | Neg | Tr. A | Neg. |
| Indole-3-acetic acid | Neg | Neg | Neg | Neg | Tr. A. |
| 2,4,6-trichlorophenol | 10 mm. Inh | S. 30/25 | S. 5/40 | S. 5/50 | S. 15/10. |

[1] See Table I for code legends.

The agents tested as potentiators in this study proved to be among the most active and versatile of any group studied to date. For example, 2,4,6-trichlorophenol, 2,4,6-trichlorophenoxyacetic acid, and alpha-(2,4,5-trichlorophenoxy)propionic acid showed marked synergistic activity with 11, 9, and 7 of the 13 anti-microbial agents, respectively. Also, 2,4,6-trichlorophenol showed synergism with chloramphenicol against *S. lutea*, with erythromycin, tetracycline, chlortetracycline, oxytetracycline, ristocetin, and bacitracin against *S. aureus*, and with isoniazid, p-aminosalicyclic acid, pyridine 3 sulfonic acid, and streptomycin against *M. tuberculosis* No. 607. The related antibiotics, tetracycline, oxytetracycline and chlortetracycline shall also be designated as tetracycline type antibiotics.

Certain of the antibiotics were particularly susceptible to potentiation by these agents. Thus, the anti-microbial activity of erythromycin was enhanced by many of the agents tested. A number of agents have been disclosed which are plant hormones or which are compounds that possess plant hormone-like activity. In addition to the specific agents disclosed, it is intended that conventional derivatives of such agents be included with the disclosure which have the plant hormone activity.

Another agent useful together with antimicrobials as a potentiating agent therefor is desyl chloride. This compound is particularly useful as a potentiating agent for penicillin, especially against streptococci such as beta-hemolytic streptococci, and for streptomycin, especially against *Klebsiella pneumoniae*, as was originally disclosed in my copending application Serial No. 263,754, also filed March 8, 1963 (which is also a continuation-in-part of my two earlier-filed applications Serial Nos. 54,842 and 846,265, identified in column 1 hereof), and in my application Serial No. 54,842.

Various changes and modifications of the invention can be made and, to the extent that such variations incorporate the spirit of this invention, they are intended to be included within the scope of the appended claims.

I claim:

1. A method of producing augmented antimicrobial activity against pathogenic bacteria which are pathogenic to man and other vertebrates, including strains of Streptococcus, *Staphylococcus aureus, Sarcina lutea, Mycobacterium tuberculosis,* and *Klebsiella pneumoniae*, which comprises concurrently contacting said bacteria with a member selected from a first group and a member selected from a second group until greater antimicrobial activity against said bacteria is demonstrable than the corresponding antibacterial activity demonstrable from said constituent members when used alone in equivalent amounts, said first group consisting of the following members:

(1) erythromycin
   (2) bacitracin
   (3) polymixin
   (4) ristocetin
   (5) isoniazid
   (6) p-amino salicyclic acid
   (7) streptomycin
   (8) penicillin
   (9) chloramphenicol
   (10) oxytetracycline
   (11) tetracycline, and
   (12) chlortetracycline and said second group consisting of the following members:

(a) indole-3-acetic acid
   (b) naphthalene acetic acid
   (c) alpha-naphthalene acetic acid
   (d) pentachlorophenoxyacetic acid
   (e) 2,3,4,6-tetrachlorophenoxyacetic acid
   (f) 2,4,6-trichlorophenoxyacetic acid
   (g) 2,4,5-trichlorophenoxyacetic acid
   (h) 3,4-dichlorophenoxyacetic acid
   (i) 2,5-dichlorophenoxyacetic acid
   (j) 2,4-dichlorophenoxyacetic acid
   (k) p-chlorophenoxyacetic acid
   (l) indole-3-propionic acid
   (m) 2,2-dichloropropionic acid
   (n) 3-(2,4,5-trichlorophenoxy) propionic acid
   (o) alpha-(2,4,5-trichlorophenoxy) propionic acid
   (p) alpha-(2,4-dichlorophenoxy) propionic acid
   (q) 2-(p-chlorophenoxy) propionic acid
   (r) 3-(p-chlorophenoxy) propionic acid
   (s) alpha-phenoxypropionic acid
   (t) 2,4,6-trichlorophenol
   (u) kinetin
   (v) furfuryl kinetin, and
   (w) desyl chloride 2. The method of claim 1, wherein the member selected from the first group is present in an inhibitory concentration.

3. The method of claim 1, wherein the member selected from the first group is present in a sub-inhibitory concentration.

4. The method of claim 1, wherein the member from the first group is oxytetracycline and wherein the member from the second group is pentachlorophenoxyacetic acid.

5. The method of claim 1, wherein the member from the first group is oxytetracycline and wherein the member from the second group is 3-(2,4,5-trichlorophenoxy)-propionic acid.

6. The method of claim 1, wherein the member from the first group is oxytetracycline and wherein the member from the second group is 2,4,6-trichlorophenol.

7. The method of claim 1, wherein the member from the first group is oxytetracycline and wherein the member from the second group is kinetin.

8. The method of claim 1, wherein the member from the first group is oxytetracycline and wherein the member from the second group is furfuryl kinetin.

9. The method of claim 1, wherein the member from the first group is tetracycline and wherein the member from said second group is pentachlorophenoxyacetic acid.

10. The method of claim 1, wherein the member from the first group is tetracycline and wherein the member from said second group is 2,4,5-trichlorophenoxyacetic acid.

11. The method of claim 1, wherein the member from the first group is tetracycline and wherein the member from said second group is 2,2-dichloropropionic acid.

12. The method of claim 1, wherein the member from the first group is tetracycline and wherein the member from said second group is 3-(2,4,5-trichlorophenoxy) propionic acid.

13. The method of claim 1, wherein the member from the first group is tetracycline and wherein the member from said second group is alpha-(2,4,5-trichlorophenoxy) propionic acid.

14. The method of claim 1, wherein the member from the first group in tetracycline and wherein the member from said second group is alpha-(2,4-dichlorophenoxy) propionic acid.

15. The method of claim 1, wherein the member from the first group is tetracycline and wherein the member from said second group is 2,4,6-trichlorophenol.

16. The method of claim 1, wherein the member from the first group is tetracycline and wherein the member from said second group is kinetin.

17. The method of claim 1, wherein the member from the first group is tetracycline and wherein the member from said second group is furfuryl kinetin.

18. The method of claim 1, wherein the member from the first group is chlortetracycline and wherein the member from the second group is indole-3-acetic acid.

19. The method of claim 1, wherein the member from the first group is chlortetracycline and wherein the member from the second group is naphthalene acetic acid.

20. The method of claim 1, wherein the member from the first group is chlortetracycline and wherein the member from the second group is 2,4,5-trichlorophenoxyacetic acid.

21. The method of claim 1, wherein the member from the first group is chlortetracycline and wherein the member from the second group is 3,4-dichlorophenoxyacetic acid.

22. The method of claim 1, wherein the member from the first group is chlortetracycline and wherein the member from the second group is p-chlorophenoxyacetic acid.

23. The method of claim 1, wherein the member from the first group is chlortetracycline and wherein the member from the second group is indole-3-propionic acid.

24. The method of claim 1, wherein the member from the first group is chlortetracycline and wherein the member from the second group is 2,2-dichloropropionic acid.

25. The method of claim 1, wherein the member from the first group is chlortetracycline and wherein the member from the second group is 3-(2,4,5-trichlorophenoxy) propionic acid.

26. The method of claim 1, wherein the member from the first group is chlortetracycline and wherein the member from the second group is 3-(p-chlorophenoxy)propionic acid.

27. The method of claim 1, wherein the member from the first group is chlortetracycline and wherein the member from the second group is alpha-phenoxypropionic acid.

28. The method of claim 1, wherein the member from the first group is chlortetracycline and wherein the member from the second group is 2,4,6-trichlorophenol.

29. The method of claim 1, wherein the member from the first group is chlortetracycline and wherein the member from the second group is kinetin.

30. The method of claim 1, wherein the member from the first group is chlortetracycline and wherein the member from the second group is furfuryl kinetin.

References Cited by the Examiner

Bechtle and Scherr: Studies on Synergists for Antimicrobial Agents,, Antimycobacterial Agents, published in Antibiotics and Chemotherapy, vol. 9, No. 12, pp. 715–721, December 1959.

Chem. Abstracts 41: 1016G; 6601G (1947).
Chem. Abstracts 42: 5954i–5955c (1948).
Chem. Abstracts 43: 2184G; 2271e–2273h (1949).
Chem. Abstracts 45: 9128D (1951).
Chem Abstracts 47: 4333i; 7038a (1953).
Chem. Abstracts 49: 4088F; 5596h (1955).
Chem Abstracts 51: 8896B (1957).
Chem Abstracts 52: 4099B; 12090i–12091a; 20404B (1958).
Chem. Abstracts 54: 10214e (May 25, 1960).

Davis et al.: "Inducing Disease Resistance With Plant Growth Regulators," Phytopath 43: 137–140 (1953).

Goodman et al.: "The Effects of Indole-3-Acetic Acid on the Plant Disease-Inhibiting Properties of Antibiotics," Science 119: 347–8 (1954).

Hemphill et al.: "Effects of Plant-Growth Regulating Substances on Control of *Erwinia amylovora* by Streptomycin and Terramycin," Science 122, 122 (1955).

Iyengar et al.: "Synergism and Antagonism of Auxin by Antibiotics," Science 118: 357–8 (1953).

Scherr and Bechtle: Studies on Synergists for Antimicrobial Agents, paper given Oct. 15–17, 1958, in Proceedings, 6th Annual Symposium on Antibiotics; paper reported in Antiobiotics Annual, 1958–1959, pp. 855–864, copyright 1959, Medical Encyclopedia, New York, N.Y.

LEWIS GOTTS, *Primary Examiner.*

FRANK CACCIAPAGLIA, JR., *Examiner.*